United States Patent
Knauf et al.

(10) Patent No.: US 6,492,476 B1
(45) Date of Patent: Dec. 10, 2002

(54) CATALYST BASED ON RARE EARTH METAL COMPOUNDS

(75) Inventors: Thomas Knauf, Dormagen (DE); Wilfried Braubach, Solingen (DE)

(73) Assignee: Bayer Aktiengesellschaft, Leverkusen (DE)

(*) Notice: Subject to any disclaimer, the term of this patent is extended or adjusted under 35 U.S.C. 154(b) by 0 days.

(21) Appl. No.: 09/697,567

(22) Filed: Oct. 26, 2000

(30) Foreign Application Priority Data

Oct. 28, 1999 (DE) .......................... 199 51 841

(51) Int. Cl.$^7$ .................................................. C08F 4/44
(52) U.S. Cl. ........................ 526/164; 526/335; 526/159; 526/128; 502/263
(58) Field of Search ................................ 526/335, 159, 526/164, 128; 502/263

(56) References Cited

U.S. PATENT DOCUMENTS

| | | | | |
|---|---|---|---|---|
| 5,286,694 A | * | 2/1994 | Pettijohn et al. | 502/110 |
| 5,529,965 A | | 6/1996 | Chang | 502/110 |
| 5,686,371 A | | 11/1997 | Ansell et al. | 502/102 |
| 6,130,299 A | * | 10/2000 | Sone et al. | 526/89 |

OTHER PUBLICATIONS

Chemical Abstracts, vol. 106, No. 22, Jun. 1, 1987, Columbus, Ohio, US; Abstract No. 177895, XP002153824, Y. Liao, et al "Polybutadiene With High Stereospecificity".

Chemical Abstracts, vol. 122, No. 24, Jun. 12, 1995, Columbus, OH, US; Abstract No. 291586, XP002153825, P. Wang, et al, "Copolymerization of Styrene and Dienes Catalyzed by 4f Metal Compounds. II. Studies on copolymerization of Styrene and Butadiene".

Chemical Abstracts, vol. 115, No. 20, Nov. 18, 1991, Columbus, OH, US; Abstract No. 208652, XP002153826, C. Yang, et al, "Polymerization of Isoprene by Homogeneous Catalyst".

* cited by examiner

Primary Examiner—David W. Wu
Assistant Examiner—Ling-Siu Choi
(74) Attorney, Agent, or Firm—Joseph C. Gil; Noland J. Cheung; Jennifer R. Seng

(57) ABSTRACT

The present invention comprises a catalyst based on rare earth metal compounds which consists of a rare earth metal compound, an organic aluminum compound and a trihalosilane, of a process for the production thereof and of the use of the catalyst for polymerizing conjugated dienes to form high molecular weight polybutadienes.

19 Claims, No Drawings

CATALYST BASED ON RARE EARTH METAL COMPOUNDS

FIELD OF THE INVENTION

The present invention relates to a catalyst based on rare earth metal compounds, to a process for the production thereof and to the use thereof for the polymerization of conjugated dienes.

BACKGROUND OF THE INVENTION

It is known to polymerize conjugated dienes with the assistance of catalysts based on rare earth metal compounds, for example, with compounds of cerium, lanthanum, praseodymium, neodymium or gadolinium. In such a case, the catalysts based on rare earth metals preferably comprise a salt of a rare earth metal, an organoaluminum compound as co-catalyst and a compound capable of liberating halogen.

In this connection, WO-A 93/05083 is referred to, which describes a process for polymerizing conjugated dienes by means of a catalyst based on rare earth metal compounds.

A disadvantage of the process described in the above-patent publication is the presence of the catalyst used therein, which is based on rare earth metal compounds using silicon halides or organosilicon halides as the halogen-providing compound. Such catalyst has low activity and the low rate of polymerization (conversion) achieved therewith.

SUMMARY OF THE INVENTION

An object of the present invention is to avoid the disadvantages of the catalyst described in WO-A 93/05083 in the polymerization of conjugated dienes and to provide a catalyst system based on rare earth metal compounds, which in particular provides an elevated space-time yield, a low polymer solution viscosity and a high molecular weight polybutadiene having excellent processing properties which exhibits improved dynamic and mechanical properties in the vulcanized state.

The object of the present invention has been achieved by a catalyst system based on rare earth metal compounds in that specific trihalosilyl compounds are used as one component of the catalyst system.

Accordingly, the present invention provides a catalyst system based on rare earth metal compounds which comprises
a) a rare earth metal compound,
b) an organic aluminum compound and
c) a trihalosilane of the formula

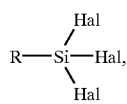

wherein
Hal represents fluorine, chlorine or bromine and
R represents hydrogen or a vinyl group,
in which components a):b):c) are present in a ratio by weight of 1:0.5–5:0.05–0.5.

DETAILED DESCRIPTION OF THE INVENTION

According to the present invention, preferred catalyst systems based on rare earth metal compounds are those in which components a):b):c) are present in a ratio by weight of (1):(1–2):(0.1–0.4).

Preferably used for component a) are rare earth metal compounds wherein the rare earth metal compounds are soluble in hydrocarbons. Corresponding rare earth metal salts are more preferably used.

Rare earth metals which may be mentioned as being particularly suitable for the synthesis of component a) are cerium, lanthanum, praseodymium, gadolinium and neodymium, wherein neodymium is more preferred.

Hydrocarbon-soluble salts which may be mentioned are neodymium carboxylates, preferably neodymium neodecanoate, neodymium naphthenate, neodymium octanate, neodymium 2,2-diethylhexanoate, neodymium 2,2-diethylheptanoate and the corresponding salts of lanthanum or praseodymium. Neodymium neodecanoate is most preferred.

The rare earth metal compounds may be used both individually and as mixtures with each other, wherein the most favorable mixture ratio may readily be determined by appropriate preliminary testing.

Organic aluminum compounds (component b)) which may be considered are the alkylaluminum compounds and alkylaluminum hydrides known for such catalyst systems, in which the alkyl group has 1 to 10, preferably 1 to 6, carbon atoms. The alkylaluminum hydrides may have one or two alkyl groups. Preferred compounds which may be mentioned are triethylaluminum, diisobutylaluminum hydride, triisobutylaluminum, more preferably diisobutylaluminum hydride.

Trihalosilyl compounds (component c)) which are used in the catalyst system according to the present invention are preferably tribromosilyl hydride, trichlorosilyl hydride, vinyltribromosilane and vinyltrichlorosilane, most preferably trichlorosilyl hydride.

Most preferred catalyst systems based on rare earth metal compounds are those which comprise
a) neodymium neodecanoate
b) diisobutylaluminum hydride and
c) trichlorosilane
wherein components a):b):c) are present in a ratio by weight of (1):(1–2):(0.1–0.4).

The present invention also provides a process for the production of the catalysts according to the present invention based on rare earth metal compounds comprising the above-stated components a), b) and c), wherein the process is characterized in that components a), b) and c) are brought into contact with each other at temperatures of –30 to 100° C., preferably of 20 to 80° C., in the above-stated quantity ratios, which means that components a):b):c) are used in a weight ratio of (1):(0.5–5):(0.05–0.5), preferably of (1):(1–2):(0.1–0.4).

The present invention also provides for the use of the catalyst system according to the present invention based on rare earth metal compounds comprising components a) to c) described above for polymerizing conjugated dienes.

The polymerization of conjugated dienes by means of a catalyst system based on rare earth metal compounds is known per se and is conventionally performed in such a manner that the dienes to be polymerized are dissolved in a suitable hydrocarbon, for example, hexane, and the catalyst components are then added.

Care must, in particular, be taken to ensure that the catalyst components, the solvent and the monomer(s) are inert, i.e. anhydrous and oxygen-free.

It is, of course, also possible to polymerize the conjugated dienes in the absence of or only in the presence of small quantities of solvents.

The catalyst system according to the present invention is preferably added to the dienes to be polymerized in a concentration such that component a) (rare earth metal compound) is present in a quantity of 0.01 to 0.2 wt. % of the diene monomers. The optimum quantity of catalyst system to be used may vary and depends upon the particular reaction conditions and upon the desired molecular weight of the polymer.

Conjugated dienes which may be polymerized with the catalyst system according to the present invention and may, in particular, be mentioned are butadiene, isoprene, piperylene, 1,3-hexadiene, 1,3-octadiene, and 2-phenyl-1,3-butadiene. The conjugated dienes may, of course, also be copolymerized as mixtures with each other. It is preferred to produce polybutadiene, polyisoprene and isoprene/butadiene copolymers.

The polydienes produced with the catalyst system according to the present invention may be used in the production of rubber articles of all kinds, preferably for the production of tires or golf balls. It is also possible, especially in the case of polybutadiene, to use the latter for the production of high impact polystyrene (HIPS).

With regard to the known prior art, it is particularly surprising that, by using the catalyst system according to the present invention based on rare earth metal compounds, in which specific trihalosilyl compounds are used, it is possible to obtain polydienes at elevated space-time yields, which are in particular distinguished by a particularly high molecular weight associated with good processing properties and improved dynamic and mechanical properties in the vulcanizates.

EXAMPLES

The polymers according to the invention were polymerized in hexane in an inert, stirred 2 liter autoclave. The catalyst components neodymium neodecanoate (0.2 mmol), diisobutylaluminum hydride (4 mmol), the co-catalyst and the desiccated, destabilized 1,3-butadiene are initially introduced at room temperature. Polymerization proceeds at 60° C. and lasts for 1 hour. The polymers are shortstopped, stabilized, stripped and dried.

A comparison is made between polymers produced using the standard process with ethylaluminum sesquichloride (0.19 mmol) and polymers produced with trichlorosilane and trichlorovinylsilane as co-catalysts (same molar quantity as EASC, relative to chlorine content). Further chlorosilanes according to Table 1 were tested.

In particular, the polymers produced with TCS and TCVS first exhibit at identical conversion (Table 1) and identical Mooney viscosity distinctly lower solution viscosities and thus, also lower a power input into the reactor stirrer (Table 2). Moreover, distinctly higher molecular weights/Mooney viscosities are obtainable using these co-catalysts than with the standard system (Table 2).

Table 3 shows the advantages of these products.

The Nd-BR produced with TCS was compared with the standard product. Although the polymer viscosity is 20 Mooney units higher (83) than that of the standard product (63), processing properties are excellent, as the mixture viscosities are identical.

Vulcanizates made from this new product corresponding to the formulation stated in Table 3 exhibit better strength and elongation at break values. Elasticity values are higher. The person skilled in the art may thus conclude that this product offers improved hysteresis properties, i.e. less generation of heat under dynamic loads. These products offer advantages in any applications subject to dynamic heating.

TABLE 1

Conversion at 60° C.

| Co-catalyst | Conversion (%), molar ratio relative to chlorine content | Conversion (%), 2 times molar ratio relative to chlorine content | Conversion (%), 6 times molar ratio relative to chlorine content |
| --- | --- | --- | --- |
| Standard | 95 | 99 | — |
| TCS | 95 | 100 | — |
| TCVS | 95 | 97 | — |
| TCMS | 0 | 57 | 96 |
| DCMPS | 53 | — | 92 |
| DCMVS | 54 | 60 | 77 |
| DCDPS | 44 | 78 | 97 |
| CTMS | 0 | 0 | 0 |
| TCOS | 0 | 11 | 93 |
| TCPS | 69 | 92 | — |
| t-BTCS | 0 | 0 | 0 |
| SiTC | 0 | 75 | 96 |
| CTBS | 0 | 0 | 0 |

| | |
| --- | --- |
| Standard | ethylaluminum sesquichloride |
| TC | Strichlorosilane |
| TCVS | trichlorovinylsilane |
| TCMS | trichloromethylsilane |
| DCMPS | dichloromethylphenylsilane |
| DCMVS | dichloromethylvinylsilane |
| DCDPS | dichlorodiphenylsilane |
| CTMS | chlorotrimethylsilane |
| TCOS | trichlorooctylsilane |
| TCPS | trichlorophenylsilane |
| t-BTCS | t-butyltrichlorosilane |
| SiTC | tetrachlorosilane |
| CTBS | chlorotributylsilane |

TABLE 2

Solution and Mooney viscosities

| Co-catalyst | Mooney viscosity ML 1 + 4, 100° C. DIN 53523 | Solution viscosity 5% in styrene (mPas$^{-1)}$) DIN 51562 | Stirrer torque (Ncm) |
| --- | --- | --- | --- |
| Standard | 25 | 290 | 325 |
| | 26 | 290 | 350 |
| | 35 | 385 | 430 |
| | 42 | 505 | 440 |
| | 53 | 770 | 445 |
| TCS | 25 | 120 | 250 |
| | 33 | 230 | 330 |

TABLE 2-continued

Solution and Mooney viscosities

| Co-catalyst | Mooney viscosity ML 1 + 4, 100° C. DIN 53523 | Solution viscosity 5% in styrene (mPas$^{-1}$) DIN 51562 | Stirrer torque (Ncm) |
|---|---|---|---|
|  | 42 | 400 | 400 |
|  | 70 | 750 | 465 |
|  | 83 | 1500 | 540 |
| TCVS | 35 | 220 | 270 |
|  | 47 | 470 | 340 |
|  | 60 | 955 | 340 |
|  | 75 | 1380 | 500 |

TABLE 3

Physical properties of TCS Nd-BR relative to standard

| TSR 5, Defo 700 | 70 | 70 |
|---|---|---|
| TCS Nd-BR (Mooney 83) | 30 |  |
| Standard Nd-BR (Mooney 63) |  | 30 |
| Carbon black N-330 | 55 | 55 |
| Enerthene ® 1849-1* | 3 | 3 |
| Stearic acid | 2.5 | 2.5 |
| Antilux ® 111** | 1 | 1 |
| Vulkanox ® 4020*** | 2.5 | 2.5 |
| Vulkanox ® HS**** | 1.5 | 1.5 |
| Zinc oxide RS | 5 | 5 |
| Vulkacit ® MOZ***** | 1.2 | 1.2 |
| Sulfur | 2.5 | 2.5 |

*mineral oil plasticizer, Mobil Schmierstoff GmbH
**light stabilizing wax, Rhein Chemie Rheinau
***antioxidant (6PPD), Bayer AG
****antioxidant (TMQ), Bayer AG
*****sulfenamide accelerator (MBS), Bayer AG

TABLE 4

Mixture properties

| ML 1 + 4 100° C. DIN 53523 | 93 | 93 |
|---|---|---|
| Vulcanizate properties (ISO 37) |  |  |
| Strength (MPa) | 26.3 | 22.5 |
| Elongation at break (%) | 420 | 400 |
| 100% modulus | 3 | 3 |
| 300% modulus | 17 | 17 |
| Shore A hardness 23° C. | 70 | 70 |
| Shore A hardness 70° C. | 68 | 68 |
| Elasticity, 23° C. | 54 | 51 |
| Elasticity, 70° C. | 67 | 63 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A catalyst based on rare earth metal compounds which comprises:

a) a rare earth metal compound,
b) an organic aluminum compound and
c) a trihalosilane of the formula

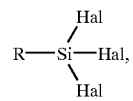

wherein

Hal represents fluorine, chlorine or bromine and
R represents hydrogen or a vinyl group,
in which components a):b):c) are present in a ratio by weight of 1:0.5–5:0.05–0.5, wherein said rare earth metal compound is soluble in hydrocarbons, and wherein said catalyst does not include a silicon tetrahalide.

2. A catalyst according to claim 2, wherein said rare earth metal compound is a rare earth metal salt.

3. A catalyst according to claim 2, wherein said rare earth metal salt is a neodymium carboxylate.

4. A catalyst according to claim 1, wherein said organic aluminum compound is an alkylaluminum compound in which the alkyl group has 1 to 10 carbon atoms.

5. A catalyst according to claim 4, wherein said alkyl group has 1 to 6 carbon atoms.

6. A catalyst according to claim 4, wherein said organic aluminum compound is selected from the group consisting of triethylaluminum, diisobutylaluminum hydride and tri-isobutylaluminum.

7. A catalyst according to claim 4, wherein said alkylaluminum compound is an alkylaluminum hydride, wherein the alkylaluminum hydride has 1 to 2 alkyl groups.

8. A catalyst according to claim 1, wherein said trihalosilyl compound is selected from the group consisting of tribromosilyl hydride, trichlorosilyl hydride, vinyltribromosilane and vinyltrichlorosilane.

9. A process for the production of the catalyst based on rare earth metal compounds comprising the step of bringing into contact a rare earth metal compound (a) with an organic aluminum compound (b) and a trihalosilyl compound (c) at temperatures of −30 to 100° C., wherein components a):b):c) are used in a weight ratio of (1):(0.5–5):(0.05–0.5), wherein said rare earth metal compound is soluble in hydrocarbons, and wherein said catalyst does not include a silicon tetrahalide.

10. A process according to claim 9, wherein said trihalosilane comprises the formula

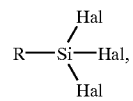

wherein

Hal represents fluorine, chlorine or bromine and
R represents hydrogen or a vinyl group.

11. A process according to claim 9, wherein said rare earth metal compound is a rare earth metal salt.

12. A process according to claim 11, wherein said rare earth metal salt is selected from the group consisting of neodymium carboxylates.

13. A process according to claim 9, wherein said organic aluminum compound is an alkylaluminum compound in which the alkyl group has 1 to 10 carbon atoms.

14. A process according to claim 13, wherein said alkyl group has 1 to 6 carbon atoms.

15. A process according to claim 13, wherein said organic aluminum compound is selected from the group consisting of triethylaluminum, diisobutylaluminum hydride and triisobutylaluminum.

16. A process according to claim 10, wherein said trihalosilyl compound is selected from the group consisting of tribromosilyl hydride, trichlorosilyl hydride, vinyltribromosilane and vinyltrichlorosilane.

17. A process for producing polydienes comprising the step of polymerizing conjugated dienes in the presence of a solvent with a catalyst based on rare earth metal compounds which comprises:

a) a rare earth metal compound, b) an organic aluminum compound and c) a trihalosilane of the formula

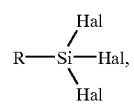

wherein
Hal represents fluorine, chlorine or bromine and
R represents hydrogen or a vinyl group,
in which component a):b):c) are present in a ratio by weight of 1:0.5–5:0.05–0.5, wherein said rare earth metal compound is soluble in hydrocarbons, and wherein said catalyst does not include a silicon tetrahalide.

18. A process according to claim 17, wherein said diene is selected from the group consisting of butadiene, isoprene, piperylene, 1,3-hexadiene, 1,3-octadiene, and 2-phenyl-1,3-butadiene.

19. A process according to claim 17, wherein said polydiene is polybutadiene, polyisoprene and isoprene/butadiene copolymers.

* * * * *